Patented May 27, 1941

2,243,785

UNITED STATES PATENT OFFICE 2,243,785

CHROMIUM RECOVERY

Marvin J. Udy, Niagara Falls, N. Y.

No Drawing. Application November 16, 1939,
Serial No. 304,659

2 Claims. (Cl. 75—5)

This invention relates to metallurgy and has for an object the provision of certain improvements in methods of producing alloys containing iron and chromium. More particularly, the invention contemplates the provision of an improved method of recovering iron and chromium from chromite ore and concentrates containing chromite mineral. The invention further contemplates the provision of an improved method of conditioning chromite mineral-bearing material to make it more amenable to reduction and the provision of an improved furnace charge material containing the chromium and iron of chromite mineral-bearing material.

In smelting chromite mineral-bearing material such as chromite ore in an electric furnace, it is desirable to provide a charge containing added slag-forming substances like lime or lime and silica for fluxing gangue materials such as silica and alumina contained in the chromite mineral-bearing material and for forming slag of suitable composition. The charge should also be sufficiently porous to permit effective escape of gases produced by reaction of a reducing agent such as carbon with the oxygen of chromium and iron compounds contained in the chromite mineral-bearing material. Many available chromite ores are friable or are of compositions such that they disintegrate while in storage, after having been mined, with the result that large proportions may be in the form of particles of such small sizes as to be unsuitable for use in forming properly porous charges for smelting with coke or other carbonaceous reducing material. Concentrates such, for example, as those produced in accordance with the procedure outlined in my copending application Serial No. 244,697, filed December 8, 1938, may also exist in the form of particles too small for effective use in forming smelting charges. The present invention provides an effective method of utilizing chromite ores and concentrates of such small particle sizes, and, at the same time, produces furnace charge materials containing the chromite minerals, or the constituents of the chromite minerals, which can be smelted more efficiently than can chromite ore in the form of particles sufficiently large to form properly porous charges.

The invention is based on my discovery that mixtures of chromite ore and lime and mixtures of chromite ore, lime and silica may be sintered readily at temperatures attainable in combustion furnaces. The method of the invention for utilizing chromite mineral-bearing materials of small particle sizes involves sintering of the materials with the slag-forming material (such as lime or lime and silica) required or desired to function as fluxing and slag-forming material in subsequent reduction operations. Sintering preferably is carried out at a temperature such that the lime may enter into chemical combination with silica employed as slag-forming material and with silica, alumina, iron oxide and chromic oxide of the chromite mineral-bearing material. The lime thus is placed in position to function most effectively as a fluxing agent when the material is smelted subsequently, and, in effect, a portion of the work required to be accomplished in smelting chromite ore according to heretofore customary practices is accomplished preliminarily in the sintering treatment of the invention. The sintering treatment of the invention may also result in the production of calcium compounds of chromium and iron which are more readily reducible than the compounds of chromium and iron contained in the original chromite mineral-bearing material.

By sintering lime or lime and silica with chromite mineral-bearing material preliminarily, it becomes possible also to employ a two-component charge instead of a three-component charge or a four-component charge for smelting. A charge comprising sintered material of the invention may consist only of the sintered material and a carbonaceous reducing agent, such as coke, whereas a charge smelted in accordance with heretofore customary practices and containing the same components would consist of three or four separate components, namely, chromite mineral-bearing material, coke and lime or lime and silica. A two component charge, as compared with a three or four component charge, provides for greater uniformity in charging which permits more effective reduction and establishes more desirable furnace operating characteristics.

The components of the sintering charges may be employed in the form of particles of any suitable sizes, but I prefer to employ the various components in the form of particles small enough to pass a 65-mesh screen or even small enough to pass a 100-mesh screen (minus 65-mesh or minus 100-mesh). Mixing of the components may be accomplished in any suitable manner, but I prefer to accomplish mixing by grinding the components together in suitable grinding apparatus such, for example, as in a ball mill or pebble mill.

In preparing charges for sintering in accordance with the invention, the lime or lime and silica and the chromite mineral-bearing material may be employed in any suitable amounts and proportions. The proportions employed will depend upon the type of smelting operation to be carried out subsequently and the results sought to be accomplished. Complete processes of my invention, for example, may include sintering followed by smelting with coke in a submerged arc electric furnace in accordance with the processes of my United States Patents Nos. 2,098,176; 2,019,122; and 2,176,689, and, in such complete processes, the sintering charges will correspond to the charges described in those patents. The proportions of various components employed in forming the charges for the sintering treatments will depend, also, upon the character of the chromite mineral-bearing material employed. Lime or lime and silica should be provided in amounts and proportions such that sintering can be accomplished in combustion heated apparatus of the type of cement kilns. If the sintered product is to be subjected to the smelting operation shortly after completion of the sintering treatment, lime may be employed in an amount in excess of that capable of combining with other compounds in the charge. If the sintered material is to be exposed to the atmosphere for a relatively long period of time before smelting, the amount of lime employed preferably should not exceed that which can combine chemically with other compounds present in the charge, as free lime in the sintered material will pick up moisture and cause disintegration of the sintered agglomerates.

Sintering may be carried out in any suitable type of apparatus and at any suitable temperature at which effective sintering can be accomplished. I prefer to employ combustion-heated apparatus of the type of a rotary cement kiln and to operate the kiln at a temperature above about 1350° C. with a sintering charge which can be sintered effectively at the temperature employed. Sintering can be accomplished readily and inexpensively in such apparatus. The atmosphere within the kiln may be reducing, oxidizing or neutral.

The sizes of sintered particles produced in treating any particular sintering charge in a rotary kiln will depend upon the temperature employed and the rate of passage of the charge through the kiln. I prefer to so operate the kiln that sintered particles having a maximum size of one inch are produced. Control of the kiln operation to produce particles having such a maximum size usually will result in the production of a sintered product in which about eighty percent of the particles are between one inch and 10-mesh in size and the remainder are minus 10-mesh in size. Such a product can be employed very effectively in smelting operations carried out in electric furnaces of the type of the submerged arc electric furnace.

Sintering of chromite mineral-bearing material in accordance with the invention produces furnace charge material which increases the capacity of the smelting furnace employed subsequently about twenty to forty percent as compared with the capacity of the same furnace in smelting an unsintered charge containing the same components as those employed in forming the sintered charge.

The following examples illustrate charges comprising chromite ore and lime and chromite ore and silica of types which I have sintered in a cement kiln operated at a temperature of about 1350° C. and which I have smelted, with coke, both in unsintered condition and in sintered condition to produce ferrochromium and ferrochrome silicon, and have obtained an increase of over twenty percent and as high as about forty percent in furnace capacity when employing the sintered product as compared with the capacity when employing the charges in unsintered condition, the chromite ore being of the composition indicated (the amounts given in the examples are in parts by weight):

ORE COMPOSITION

| | Per cent |
|---|---|
| $Cr_2O_3$ | 44.0 |
| FeO | 23.8 |
| $SiO_2$ | 6.2 |
| $Al_2O_3$ | 13.8 |
| MgO | 8.3 |
| CaO | 3.0 |

Example I

| | Parts |
|---|---|
| Ore | 100 |
| Lime (CaO) | 18 |

Example II

| | Parts |
|---|---|
| Ore | 100 |
| Lime (CaO) | 18 |
| Silica ($SiO_2$) | 6 |

Example III

| | Parts |
|---|---|
| Ore | 100 |
| Lime (CaO) | 18 |
| Silica ($SiO_2$) | 10 |

I claim:

1. The method of treating chromite ore to prepare a charge suitable for smelting with a carbonaceous reducing agent to reduce chromium contained in the ore to the metallic state which comprises grinding the chromite ore, and subjecting the ground ore product to a sintering treatment in the presence of lime to form an agglomerated product containing ore particles and lime in intimate association.

2. The method of treating chromite ore to prepare a charge suitable for smelting with a carbonaceous reducing agent to reduce chromium contained in the ore to the metallic state which comprises grinding the chromite ore, and subjecting the ground ore product to a sintering treatment in the presence of lime and silica to form an agglomerated product containing ore particles, lime and silica in intimate association.

MARVIN J. UDY.

CERTIFICATE OF CORRECTION.

Patent No. 2,243,785.　　　　　　　　　　　　　　May 27, 1941.

MARVIN J. UDY.

It is hereby certified that error appears in the printed specification of the above numbered patent requiring correction as follows: Page 2, first column, line 12, for "2,019,122" read --2,109,122--; and that the said Letters Patent should be read with this correction therein that the same may conform to the record of the case in the Patent Office.

Signed and sealed this 17th day of March, A. D. 1942.

(Seal)

Henry Van Arsdale,
Acting Commissioner of Patents.